United States Patent Office 3,485,036
Patented Dec. 23, 1969

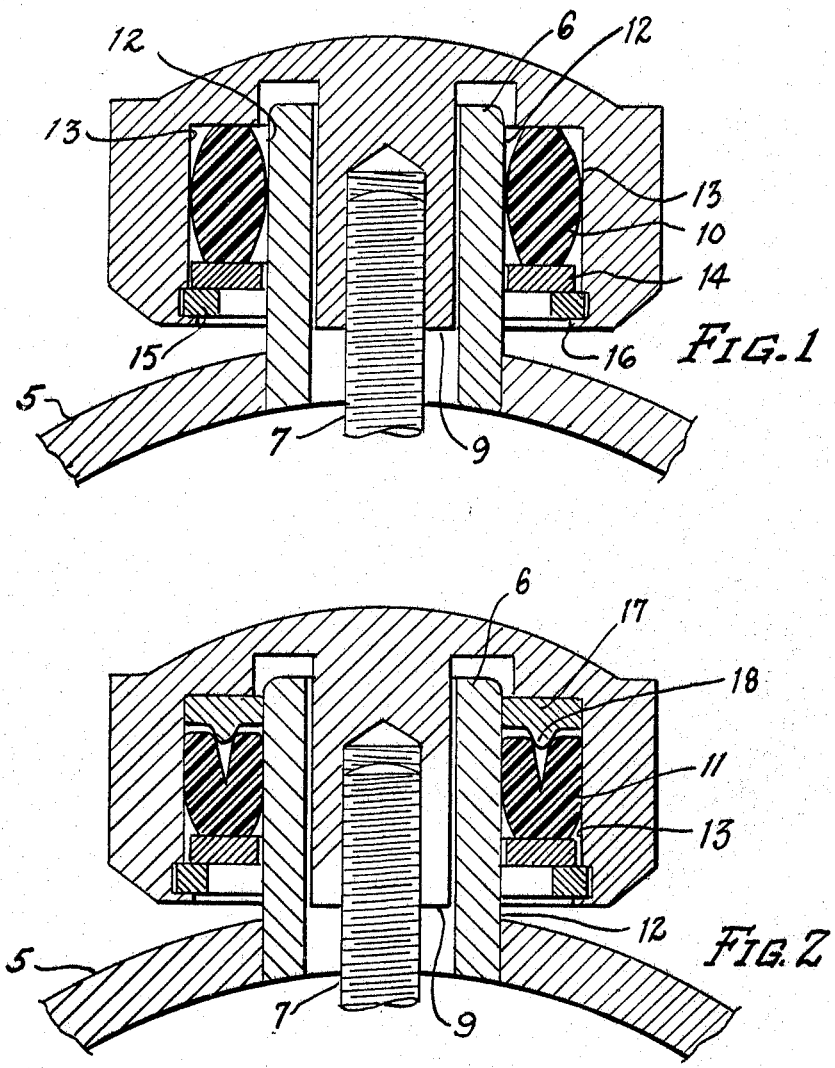

3,485,036
HIGH PRESSURE WATERTIGHT WATCH CROWN
Walther A. Feurer, 77 Lafayette Ave.,
North White Plains, N.Y. 10603
Filed July 7, 1967, Ser. No. 651,814
Int. Cl. G04b 37/10
U.S. Cl. 58—90                                5 Claims

ABSTRACT OF THE DISCLOSURE

Watch crown maintained watertight under high pressure when submerged to great depth by a free floating resilient packing ring of curvilinear cross section in free sliding engagement at opposite sides with watchcase tube and inner wall of crown and supported in such free sliding engagement by a ring of non-corrosive material free of both the tube and the crown body and secured in such free floating relation by a retainer ring fixed to the rim of the crown.

---

FIG. 1 in the accompanying drawing is a broken cross sectional view of one of the present forms of the invention.

FIG. 2 is a similar view of another embodiment of the invention.

In both these views the band or ring of the watchcase is indicated at 5, having the usual projecting fixed tube 6 for the stem 7 of the instrument.

In both illustrated embodiments, the crown 8 is of hollow construction, having a screw post 9 for detachable engagement with the winding and setting stem 7.

A pressure resistant, watertight, dusttight, and substantially airtight connection between crown and case tube is effected in this invention by a resilient compressible sealing ring of curvilinear cross section, such as shown at 10 in FIG. 1, or 11 in FIG. 2, confined in free sliding and rotational engagement at opposite sides with the smooth circular external wall 12 of the tube and the smooth circular internal wall 13 of the crown.

This sealing ring is confined and held in this free rotary and sliding condition by an annular washer 14, of non-corrosive, anti-electro chemical potential material, such as plastic or the like, of greater internal diameter than the external diameter of the tube and of lesser external diameter than the internal diameter of the crown body.

This free acting retainer washer is slidably supported on a narrower ring 15, which is fixedly secured in the bottom of the crown by an inwardly turned flange 16.

External pressure against washer 14 serves to compress the sealing ring, increasing waterproofing effect with increase in pressure.

The curvilinear contacting surfaces of the packing ring in free sliding engagement with the smooth walls of the tube and crown, supported and held so by the non-corrosive ring 14, supported and held by the narrow retaining ring 15, maintain fully watertight seal under high pressure water conditions, such as encountered when submerged to great depths.

This high pressure is effective against the wide supporting washer or ring 14; the sealing action increasing with the pressure.

The sealing rings may be of different cross sectional shapes.

The oval cross section of ring 10 first shown, may be preferred for certain purposes or for general use.

The packing ring 11 in FIG. 2 is shown as of generally V-shape cross section, with external curvilinear surfaces at opposite sides, and an annular abutment washer is shown at 17 in the back of the crown, having a ridge 18, entering the notch in the sealing ring to act as a spreader effecting close engagement of the packing ring with the opposing walls of the tube and crown.

In both forms illustrated, the sealing ring has extended curvilinear surfaces in free sliding contact with smooth curved surfaces of the case tube and crown and is supported by a washer having extended surface exposed to the pressure source and freely confined in the crown.

The oval shape ring is disposed with the major axis of the ellipse substantially parallel with the center axis of tube and crown and the same general effect is accomplished with the V-cross section ring so that full practical high pressure watertight seal is effected in both forms illustrated.

While the cross sectional shapes of sealing rings shown may generally be preferred, it will be understood that these resilient sealing rings may be of other cross sectional shapes.

What is claimed is:
1. A high pressure watertight watch crown construction comprising in combination with a watch case having a fixed projecting tube with a smooth circular external surface,
   a hollow crown having a circular internal smooth surface opposed to the circular external smooth surface of the tube,
   a packing ring of resilient material having curvilinear contacting surfaces in free sliding engagement with the smooth circular opposed surfaces of the tube and crown,
   said curvilinear contacting surfaces of said packing having a radius of curvature from top to bottom substantially greater than the space between the adjacent opposed surfaces of the tube and crown,
   an annular supporting washer of non-corrosive anti-electrochemical potential material in supporting engagement with said packing ring and in position surrounding said tube and free of both said tube and said circular internal wall of the crown, and
   a narrow retaining ring fixed in the crown body beneath and in free sliding supporting engagement with said annular supporting washer.

2. The invention according to claim 1 with said packing ring of oval cross section disposed with the major axis of said oval cross section parallel with the center axis of the case tube and crown.

3. The invention according to claim 1, in which said supporting washer is wider than said retaining ring and exposed to external pressure so as to compress the sealing ring with increased waterproofing effect with increase in the pressure to which the watch crown is subjected.

4. A high pressure watertight watch crown construction comprising in combination with a watch case having a fixed projecting tube with a smooth circular external surface,
   a hollow crown having a circular internal smooth surface opposed to the circular external smooth surface of the tube,
   a packing ring of resilient material having curvilinear contacting surfaces in free sliding engagement with the smooth circular opposed surfaces of the tube and crown,
   an annular supporting washer of non-corrosive anti-electrochemical potential material in supporting engagement with said packing ring and in position surrounding said tube and free of both said tube and said circular internal wall of the crown, and a narrow retaining ring fixed in the crown body beneath and in free sliding supporting engagement with said annular supporting washer, said packing ring being of V-cross section with the sides of the V-formation spread apart into engagement with the circular walls of the tube and crown.

5. The invention according to claim 4 with a washer over said packing ring having an annular ridge holding the sides of said packing ring in the spread apart engagement with the tube and crown.

References Cited

UNITED STATES PATENTS

| 2,405,928 | 8/1946 | Feurer | 58—90 |
| 2,912,819 | 11/1959 | Waldman | 58—90 |

FOREIGN PATENTS 592,494  2/1960  Canada.

RICHARD B. WILKINSON, Primary Examiner

GEORGE H. MILLER, Jr., Assistant Examiner